United States Patent
Urrutia et al.

(10) Patent No.: US 8,430,942 B2
(45) Date of Patent: Apr. 30, 2013

(54) COMPOSITION FOR INHIBITING UREASE AND NITRIFICATION

(75) Inventors: Oscar Urrutia, Pamplona (ES); Sara San Francicso, Noain (ES); Josemaria Garcia-Mina, Iza (ES); Jean-Claude Yvin, Saint Malo (FR)

(73) Assignee: Timac Agro International, Saint Malo (FR)

( * ) Notice: Subject to any disclaimer, the term of this patent is extended or adjusted under 35 U.S.C. 154(b) by 277 days.

(21) Appl. No.: 12/811,311

(22) PCT Filed: Dec. 30, 2008

(86) PCT No.: PCT/FR2008/052432
§ 371 (c)(1),
(2), (4) Date: Nov. 16, 2010

(87) PCT Pub. No.: WO2009/083701
PCT Pub. Date: Jul. 9, 2009

(65) Prior Publication Data
US 2011/0113842 A1    May 19, 2011

(30) Foreign Application Priority Data
Dec. 31, 2007 (FR) ..................... 07 60455

(51) Int. Cl.
*A01N 57/26* (2006.01)
*C05C 9/00* (2006.01)
*C05F 11/00* (2006.01)

(52) U.S. Cl.
USPC ............. 71/11; 71/23; 71/28; 71/29; 71/64.1; 504/127

(58) Field of Classification Search ............... 71/11–30, 71/64.1; 504/127
See application file for complete search history.

(56) References Cited

U.S. PATENT DOCUMENTS

| 4,517,007 A | 5/1985 | Swerdloff et al. |
| 4,676,822 A * | 6/1987 | Gautney ............................. 71/29 |
| 5,024,689 A * | 6/1991 | Sutton et al. ...................... 71/29 |
| 5,364,438 A * | 11/1994 | Weston et al. .................... 71/29 |
| 5,698,003 A * | 12/1997 | Omilinsky et al. ............... 71/28 |
| 6,336,949 B1 | 1/2002 | Patra et al. |

(Continued)

FOREIGN PATENT DOCUMENTS

| DE | 103 17 895 | 11/2004 |
| EP | 0 945 066 | 9/1999 |

(Continued)

OTHER PUBLICATIONS

International Search Report of PCT/FR2008/052432, dated Oct. 15, 2009.

(Continued)

*Primary Examiner* — Wayne Langel
(74) *Attorney, Agent, or Firm* — Hamre, Schumann, Mueller & Larson, P.C.

(57) ABSTRACT

The subject matter of the present invention is a composition for inhibiting urease and nitrification, which may be in liquid or solid form and which comprises at least one compound for inhibiting urease, of phosphoramide type, combined with an essential oil of *Allium* preferably originating from *Allium sativum*. This composition may be used in combination with a urea-based fertilizer for the manufacture of fertilizing compositions.

26 Claims, 1 Drawing Sheet

U.S. PATENT DOCUMENTS

| | | | | |
|---|---|---|---|---|
| 7,297,659 | B2* | 11/2007 | Nautiyal et al. | 504/102 |
| 8,137,429 | B2* | 3/2012 | Marks | 71/27 |
| 2008/0016765 | A1* | 1/2008 | Hartmann et al. | 47/58.1 SC |

FOREIGN PATENT DOCUMENTS

| | | |
|---|---|---|
| ES | 2 264 386 | 12/2006 |
| GB | 1 465 533 | 2/1977 |
| WO | 01/72665 | 10/2001 |
| WO | 2005/075602 | 8/2005 |
| WO | 2007/144694 | 12/2007 |

OTHER PUBLICATIONS

Bremner et al., "Evidence that the adverse effect of urea fertilizer on seed germination in soil is due to ammonia formed through hydrolysis of urea by soil urease," Proc. Natl. Acad. Sci., vol. 86, pp. 8185-8188, 1989.

Fertilizer Manual, Klewer Academic Publisher, pp. 259-268, 1998.

Zhengping et al., "Effect of urease inhibitors on urea hydrolysis and ammonia volatilization," Biology of Fertility of Soils, pp. 43-47, 1991.

* cited by examiner

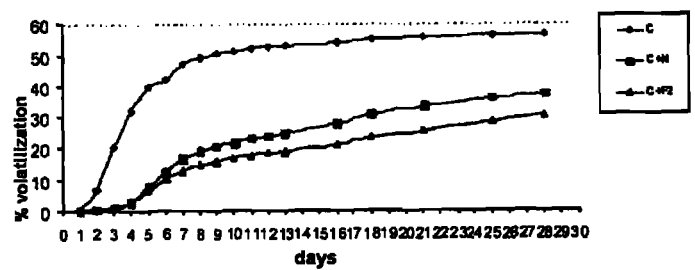

COMPOSITION FOR INHIBITING UREASE AND NITRIFICATION

The present invention is directed to a novel composition which inhibits urease and nitrification and which comprises an *Allium* essential oil, and also to its use in the preparation of urea-based fertilizers.

The invention has application in particular in the agricultural field.

Nitrogen is one of the three essential fertilizing elements for plants.

For this reason, numerous chemical compounds comprising nitrogen have been used as fertilizer. Among these compounds, urea, which comprises approximately 45% by weight of nitrogen, is currently one of the most widely used in the world.

However, urea-based fertilizing compositions can lose a significant amount of their nitrogen content when applied to a soil. This is because, at the soil surface, urea is converted into ammonia, which is a volatile form of nitrogen, and this process is accelerated in particular by hydrolysis of the urea under the action of the urease enzyme. In addition, a portion of the ammonia thus formed is converted into ammonium and then to nitrite and to nitrate ($NO_3$), which also results in losses of nitrogen by denitrification or leaching.

Thus, in order to increase the effectiveness of urea as fertilizer, the proposal has been made to combine it with compounds capable of inhibiting urease and the natural process of nitrification.

Among the various known urease inhibitors, phosphoramides and in particular N-(n-butyl)thiophosphoric triamide (NBPT) have proven to be particularly effective.

The commercial use of phosphoramides in fertilizing compositions has suffered from the difficulty of developing stable formulations which can be stored before they are applied to the soil.

In order to overcome this difficulty, the proposal has been made, in particular in U.S. Pat. No. 5,698,003, to combine these urease inhibitors of phosphoramide type with a solvent system, such as, in particular, a glycol or a glycol derivative.

However, the use of fertilizing compositions comprising such a solvent system is not entirely satisfactory:
  firstly, in terms of the effectiveness with respect to the above-mentioned process of nitrogen loss; and
  secondly, due to their relatively harmful effects on the environment and to the induction of phytotoxicity problems, as described by Krogmeier et al. in Proc. Natl. Acad. Sci., vol. 86, in 1989.

Under these conditions, the purpose of the present invention is to solve the technical problem consisting of the provision of a novel urea-based fertilizing composition comprising a phosphoramide as urease inhibitor which exhibits an improved effectiveness with regard to the compositions of the state of the art whilst being more respectful of the environment and less phytotoxic.

It has been discovered, and this constitutes the basis of the present invention, that *Allium* essential oil constitutes a particularly advantageous solvent to be used with urease inhibitors of the phosphoramide type which makes it possible to satisfactorily solve this technical problem on the industrial and agronomic scale, insofar as:
  it potentiates the activity of the phosphoramides, in particular by resulting in a greater reduction in the conversion of the urea into ammonia and by preventing losses of nitrogen by denitrification;
  it protects the urease inhibitor from chemical and/or biological decomposition processes; and
  it makes it possible to obtain compositions which are more respectful of the environment due to its natural character.

Thus, according to a first aspect, the present invention is directed to a urease-inhibiting composition which comprises at least one urease-inhibiting compound of the phosphoramide type in combination with an *Allium* essential oil.

The *Allium* essential oil used in the context of the present invention can be obtained by extraction methods known per se from various species of monocotyledonous plants of the Alliaceae family, such as, in particular, *Allium sativum, Allium ascalonicum, Allium moly, Allium neapolitanum, Allium roseum, Allium scorodoprasum, Allium sphaerocephalon, Allium tricoccum, Allium triquetru, Allium tuncelianum, Allium ursinum, Allium victoralis* or *Allium vineale*.

Preferably, use will be made of an essential oil of *Allium sativum*, commonly known under the name of garlic.

According to a first embodiment, this composition according to the invention is provided in the liquid form, the urease-inhibiting compound being dissolved in a solvent system comprising said *Allium* essential oil and optionally one or more cosolvents.

This liquid composition may additionally comprise one (or more) surfactant(s).

The cosolvent may be of various origins and will be chosen in particular from the solvents most respectful of the environment.

Use will be made, as cosolvent, for example, of a compound chosen from methyl esters and other derivatives of vegetable oils, siloxanes and their derivatives, pyrrolidones, alkylpyrrolidones, mono-, di- or triethanolamines and preferably triethanolamine.

The cosolvent may represent up to 50% by weight and preferably up to 30% by weight of the weight of the solvent system.

Likewise, the surfactant can be of varied nature and will be chosen in particular from the surfactants most respectful of the environment.

Use will be made, as surfactant, for example, of a nonionic, ionic or zwitterionic surfactant, in particular a surfactant chosen from alkyl ester sulfonates, alkyl sulfates, alkylamide sulfates, salts of saturated or unsaturated fatty acids and/or their alkoxylated derivatives, primary or secondary alkylsulfonates, alkylsuccinamates, alkylsulfosuccinates, monoesters or diesters of sulfosuccinates, alkylglycoside sulfates, sophorolipids, alkoxylated alkylphenols, aliphatic alcohols, alkoxylated fatty acids, alkoxylated fatty acid amides, alkoxylated amines, alkoxylated amidoamines, amine oxides or alkylpolyglycosides.

The surfactant can represent up to 10% by weight and preferably up to 5% by weight of the weight of the solvent system.

Generally, the urease-inhibiting compound used in the context of the present invention is a compound of the phosphoramide type. Preferably, use will be made of N-(n-butyl) thiophosphoric triamide (NBPT) alone or as a mixture with one or more other known urease-inhibiting compounds.

The relative proportions of urease-inhibiting compound(s) and of solvent system can vary within wide limits.

Generally, a liquid composition according to the invention comprises:
  from 0.01 to 50 parts by weight, preferably from 10 to 40 parts by weight, of a urease-inhibiting compound;
  from 50 to 99.99 parts by weight, preferably from 40 to 90 parts by weight, of a garlic essential oil-based solvent system, the ratio by weight of the urease-inhibiting compound to the solvent system preferably being comprised between 1:1 and 1:10, preferably between 1:2 and 1:5.

Advantageously, the pH of a liquid composition according to the invention is comprised between 8 and 12, more preferably between 9 and 10. If appropriate, an agent which makes it possible to adjust the pH within these ranges of values will be added to the composition. Such an agent may, for example, be potassium hydroxide or sodium hydroxide.

A liquid composition according to the invention may be prepared by simple mixing, preferably under continuous stirring of the various constituents in a reactor.

This mixture may be produced under various pressure and temperature conditions. Advantageously, this mixture will be produced at a temperature of between 25 and 60° C. at atmospheric pressure.

According to an alternative embodiment which is currently preferred, a liquid composition according to the invention may be prepared:

- by mixing, if appropriate, the *Allium* essential oil and a cosolvent and/or a surfactant;
- by adding, to the *Allium* essential oil or to the solvent system thus formed, one or more urease inhibitors;
- by keeping the reaction medium under stirring for a time sufficient to allow for the dissolution of the urease-inhibiting compound in said solvent system;
- by adjusting, if appropriate, the pH to a value of between 8 and 12, preferably between 9 and 10, for example by the addition of potassium hydroxide or sodium hydroxide to the reaction medium.

According to a second embodiment, the urease-inhibiting composition according to the invention is provided in a solid form and comprises a solid support on which a liquid composition as described above is absorbed.

Various types of solid supports can be used.

The term "support" denotes a natural or synthetic and organic or inorganic material, the combination of which with the urease-inhibiting composition according to the invention makes it possible to facilitate the application thereof to the soil or to the plant.

This support is thus generally inert and it must be compatible with an agricultural use. Mention will be made, among the solid supports, in particular, of clay type supports, such as sepiolite, zeolite or attapulgite; natural or synthetic silicates; amorphous silica; waxes; synthetic resins, preferably biodegradable synthetic resins, such as, in particular, polyacrylamides; and absorbent natural organic substances, such as, for example, leonardite or peat.

Such a solid composition according to the invention may be prepared by any process which allows the solid support to absorb the liquid composition described above.

Such a process may comprise, for example, a step of subjecting the starting materials, optionally in combination with inorganic fillers, such as, for example, sea calcium or lithothamnion, dolomite, calcium sulfate, natural phosphate or potassium chloride, to a granulation treatment by mixing employing a liquid composition according to the invention as described above.

The liquid or solid compositions which have just been described can be used by direct application to a soil, in particular for inhibiting the conversion of urea to ammonia or the conversion of ammonia to nitrate.

Thus, according to a second aspect, the present invention is directed to the use of a composition comprising at least one urease-inhibiting compound of the phosphoramide type in combination with an *Allium* essential oil as described above for the inhibition of the conversion of urea into ammonia or the conversion of ammonia into nitrate.

In this application, the urease-inhibiting compositions according to the invention may be used in an amount generally of between 1 and 30 kg/ha, preferably in an amount of between 5 and 10 kg/ha, corresponding to an amount of urease-inhibiting compound(s) respectively of between 0.25 and 5 kg/ha, preferably between 1.25 and 2.5 kg/ha.

The liquid and solid compositions which have just been described can also be used in combination with a urea-based fertilizer for producing fertilizing compositions.

Thus, according to a third aspect, the present invention is directed to a fertilizing composition which comprises:

- a urea-based fertilizer;
- a composition for agricultural use as described above.

In these fertilizing compositions, the urea-based fertilizer is preferably provided in the solid form, advantageously in the form of granules. Of course, the urea-based fertilizer can also be provided in the liquid form. Such urea-based fertilizers are well known in the agricultural field.

The composition combining the urease-inhibiting compound of the phosphoramide type and the *Allium* essential oil, advantageously chosen as originating from *Allium sativum*, may be added to the urea-based fertilizer, either in the solid form, for example by simple mixing when the fertilizer is itself in the solid form, or in the liquid form, for example by simple mixing, when the fertilizer is itself in the liquid form, or also by spraying or granulation, when the fertilizer is itself in the solid form.

In this application, the urease-inhibiting composition will generally be used in an amount of between 1 and 10 kg, preferably between 3 and 6 kg, per tonne of urea-based fertilizer, corresponding to an amount of urease-inhibiting compound(s) of between 0.25 and 2.5 kg/ha, preferably between 0.75 and 1.5 kg/ha.

The following non-limiting examples will illustrate the present invention.

In these examples, the following abbreviation is used:
NBPT: N-(n-butyl)thiophosphoric triamide.

EXAMPLE 1

Preparation of a Urease-inhibiting Composition According to the Invention

The following are introduced into a reactor provided with continuous stirring:
- 749 g of garlic essential oil;
- 250 g of NBPT;
- 1 g of sodium hydroxide.

The reaction medium is kept under continuous stirring at 25° C. and under atmospheric pressure until the NBPT has completely dissolved.

A liquid composition is thus obtained which is stable (that is to say which does not precipitate and in which the concentration of urease-inhibiting compound is constant).

EXAMPLE 2

Preparation of a Urease-inhibiting Composition According to the Invention

The following are introduced into a reactor provided with continuous stirring:
- 380 g of garlic essential oil;
- 250 g of NBPT;
- 370 g of triethanolamine.

The reaction medium is kept under continuous stirring at 25° C. and under atmospheric pressure until the NBPT has completely dissolved.

A liquid composition is thus obtained which is stable (that is to say which does not precipitate and in which the concentration of urease-inhibiting compound is constant).

EXAMPLE 3

Preparation of a Fertilizing Composition According to the Invention

In this example, use is made of a urea-based fertilizer provided in the form of granules.

A urease-inhibiting composition according to example 1 or 2 is sprayed over the above-mentioned fertilizer, preferably at the end of the process for granulating the urea carried out, for example, as described in the Fertilizer Manual, Klewer Academic Publisher, 1998, pages 259 to 268.

The following were thus mixed in this example:
1000 kg of urea
5 kg of a formulation according to example 1 or 2.

The product thus obtained is provided in the form of granules coated with the urease-inhibiting composition.

DEMONSTRATION OF THE EFFECTS OF THE COMPOSITIONS ACCORDING TO THE INVENTION

In order to demonstrate the advantageous effects of the urease-inhibiting compositions in accordance with the invention, the different degrees of conversion of urea into ammonia obtained after treatment of a soil were compared:

on the one hand, with a commercial NBPT-based composition; and on the other hand, with a composition according to example 2.

In both cases, the soil was treated beforehand with a urea-based fertilizer and an organic material (wheat straw) was spread, in an amount of approximately 0.1% with respect to the amount of soil treated, at the surface of the soil in order to provide the best possible conditions for the "volatilization" of nitrogen to occur.

By way of a comparison, the degree of conversion of the urea into ammonia was also measured just after the pretreatment with the urea-based fertilizer.

The degree of conversion (percentage of volatilization) of the urea into ammonia was measured in accordance with the method described in the following document: Zhengping, W., Van Cleemput, O., Demeyer, P. and Baert, L. Effect of urease inhibitors on urea hydrolysis and ammonia volatilization. Biol. Fert. Soils, 1991, 11, 43-47.

The experiments were carried out in 250 ml flasks containing 100 g of lime soil incorporating 20% of sand (2 to 3 mm) and by adding thereto an amount of fertilizer equivalent to 0.0874 g of nitrogen.

The urease-inhibiting compositions tested were applied by spraying in an amount corresponding to 0.5% by weight of NBPT, with respect to the weight of urea.

The concentrations of urea and of ammonium in the soil were measured using the method described in Zhengping, W., Van Cleemput, O., Demeyer, P. and Baert, L. Effect of urease inhibitors on urea hydrolysis and ammonia volatilization. Biol. Fert. Soils, 1991, 11, 43-47.

The results obtained after 28 days are summarized in table I below.

TABLE I

| Composition tested | Converted urea | |
|---|---|---|
| | in mg of nitrogen/pot | in % |
| Urea alone | 50.55 | 56.61 |
| Commercial NBPT | 33.30 | 37.29 |
| Example 2 | 27.37 | 30.65 |

| Composition tested | Urea content in soil | |
|---|---|---|
| | in mg of nitrogen/pot | in % |
| Urea alone | 42.28 | 100 |
| Commercial NBPT | 57.96 | 137 |
| Example 2 | 64 | 152 |

| Composition tested | Ammonium content in soil | |
|---|---|---|
| | in mg $NH_4$/pot | en % |
| Urea alone | 3.61 | 100 |
| Commercial NBPT | 5 | 138 |
| Example 2 | 9.45 | 259 |

Furthermore, the percentage of volatilization as a function of time has been represented in the figure.

In this figure:
curve C corresponds to the results obtained with urea alone;
curve C+N corresponds to the results obtained with urea in combination with commercial NBPT;
curve C+F2 corresponds to the results obtained with the composition according to example 2.

The results thus obtained show that a urease-inhibiting composition in accordance with the invention significantly potentiates (approximately by 17.8%) the effect of NBPT on urea volatilization.

Likewise, these results show that a formulation according to the invention makes it possible to very significantly increase the content of ammonium in the soil, both by comparison with urea alone (gain of approximately 159%) and by comparison with a commercial NBPT composition (gain of approximately 38%).

The result of this is that the *Allium* essential oil indeed constitutes a solvent which is particularly advantageous for urease inhibitors of the phosphoramide type and in particular for NBPT.

What is claimed is:

1. A composition which inhibits urease and nitrification, wherein said composition comprises at least one urease-inhibiting phosphoramide compound in combination with an *Allium* essential oil.

2. The composition as claimed in claim 1, wherein the *Allium* essential oil is obtained from monocotyledonous plants of the Alliaceae family.

3. The composition as claimed in claim 2, wherein the *Allium* essential oil is obtained from *Allium sativum*, commonly known under the name of garlic.

4. The composition as claimed in claim 1, wherein said composition is provided in the liquid form, said urease-inhibiting compound being dissolved in a solvent system comprising said *Allium* essential oil with or without a cosolvent.

5. The composition as claimed in claim 4, wherein said cosolvent is present and is selected from the group consisting of methyl esters and other derivatives of vegetable oils, siloxanes and their derivatives, pyrrolidones, alkylpyrrolidones and mono-, di- or triethanolamines.

6. The composition as claimed in claim 5, wherein said cosolvent is triethanolamine.

7. The composition as claimed in claim 1, wherein said urease-inhibiting compound is NBPT.

8. The composition as claimed in claim 5, wherein said composition comprises:
from 0.01 to 50 parts by weight of a urease-inhibiting compound;
from 50 to 99.99 parts by weight of said *Allium* essential oil-based solvent system.

9. A composition which inhibits urease and nitrification, wherein said composition comprises at least one urease-inhibiting phosphoramide compound in combination with an *Allium* essential oil,
wherein said composition is provided in the solid form and comprises a solid support on which a liquid composition as claimed in claim 4 is absorbed.

10. The composition as claimed in claim 9, wherein said solid support is selected from the group consisting of clay supports; natural or synthetic silicates;
amorphous silica; waxes; synthetic resins; and absorbent natural organic substances.

11. The composition as claimed in claim 2, wherein the monocotyledonous plants of the Alliaceae family is selected from the group consisting of *Allium sativum, Allium ascalonicum, Allium moly, Allium neapolitanum, Allium roseum, Allium scorodoprasum, Allium sphaerocephalon, Allium tricoccum, Allium triquetru, Allium tuncelianum, Allium ursinum, Allium victoralis* and *Allium vineale.*

12. The composition as claimed in claim 3, wherein said composition is provided in the liquid form, said urease-inhibiting compound being dissolved in a solvent system comprising said *Allium* essential oil with or without a cosolvent.

13. The composition as claimed in claim 3, wherein said urease-inhibiting compound is NBPT.

14. The composition as claimed in claim 6, wherein said urease-inhibiting compound is NBPT.

15. The composition as claimed in claim 3, wherein said composition is provided in the solid form and comprises a solid support on which a liquid composition is absorbed, said urease-inhibiting compound being dissolved in a solvent system comprising said *Allium* essential oil with or without a cosolvent.

16. The composition as claimed in claim 6, wherein said composition is provided in the solid form and comprises a solid support on which a liquid composition is absorbed, said urease-inhibiting compound being dissolved in a solvent system comprising said *Allium* essential oil with or without a cosolvent.

17. The composition as claimed in claim 7, wherein said composition is provided in the solid form and comprises a solid support on which a liquid composition is absorbed, said urease-inhibiting compound being dissolved in a solvent system comprising said *Allium* essential oil with or without a cosolvent.

18. A fertilizing composition, which comprises:
a urea-based fertilizer
a composition as claimed in claim 1.

19. A fertilizing composition, which comprises:
urea-based fertilizer and
a composition as claimed in claim 3.

20. A fertilizing composition, which comprises:
a urea-based fertilizer and
a composition as claimed in claim 6.

21. A fertilizing composition, which comprises:
a urea-based fertilizer and
a composition as claimed in claim 7.

22. A method for fertilizing a soil and inhibiting the conversion of urea into ammonia or the conversion of ammonia into nitrate comprising the step of applying a composition as claimed in claim 1 to the soil.

23. A method as claimed in claim 22, wherein said composition is applied in an amount of between 1 and 30 kg/ha.

24. A method for fertilizing a soil and inhibiting the conversion of urea into ammonia or the conversion of ammonia into nitrate, comprising the step of applying a composition as claimed in claim 3 to the soil.

25. A method for fertilizing a soil and inhibiting the conversion of urea into ammonia or the conversion of ammonia into nitrate, comprising the step of applying a composition as claimed in claim 6 to the soil.

26. A method for fertilizing a soil and inhibiting the conversion of urea into ammonia or the conversion of ammonia into nitrate, comprising the step of applying a composition as claimed in claim 7 to the soil.

\* \* \* \* \*